United States Patent Office.

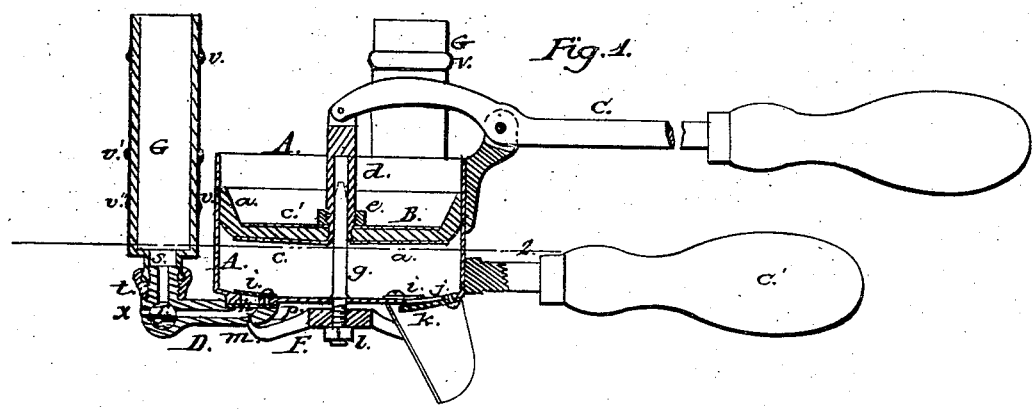

GEORGE H. GARDNER, OF PHILADELPHIA, PENNSYLVANIA, ASSIGNOR TO HIMSELF AND A. B. COOLEY, OF SAME PLACE.

Letters Patent No. 68,358, dated September 3, 1867.

IMPROVED COW-MILKER.

*The Schedule referred to in these Letters Patent and making part of the same.*

TO ALL WHOM IT MAY CONCERN:

Be it known that I, GEORGE H. GARDNER, of Philadelphia, Pennsylvania, have invented an improved Cow-Milker; and I do hereby declare the following to be a full, clear, and exact description of the same.

My invention consists of certain improvements, fully described hereafter, in the cow-milker for which Letters Patent were granted to me on the twentieth day of December, 1864.

In order to enable others to make and use my invention, I will now proceed to describe its construction and operation, reference being had to the accompanying drawing, which forms a part of this specification, and in which—

Figure 1 is a vertical section of my improved cow-milker.

Figure 2, a sectional plan view of the same on the line 1–2, fig. 1; and

Figure 3, an inverted plan view.

Similar letters refer to similar parts throughout the several views.

A is a circular vessel, in which is arranged to slide vertically a piston, B, consisting of a disk of leather, $a$, turned up at the edges, as shown in fig. 1, and held between circular metallic plates or disks, $c$ and $c'$. The leather rests upon the plate $c$, which is secured to or forms a part of a vertical rod, $d$, and the upper plate $c'$ is forced down upon the leather by a nut, $e$, upon the said rod. The rod $d$ is connected to the short arm of a hand-lever, C, which is hung to a bracket on one side of the vessel A, and provided at its outer end with a suitable handle, $f$, a handle, C', being secured to the same side of the vessel A, for a purpose described hereafter. The plunger B is guided by a rod, $g$, which is secured to the bottom of the vessel A, and which enters the hollow rod $d$, as shown in fig. 1. In the bottom of the vessel A are four openings, $h$, each of which is covered by a flap-valve, $i$, (of leather, or equivalent material,) which opens upward, and a fifth opening, $j$, is covered by a flap-valve, $k$, which opens in an opposite direction, (see figs. 1 and 2.) Beneath the vessel are four radial pipes, D, each of which communicates with one of the openings $h$, these pipes being confined to the bottom of the vessel by a four-armed plate, F, through which passes the lower screwed end of the rod $g$, the latter being furnished with a nut, $l$, bearing against the plate. The pointed end $m$ of each of the arms of the plate F is directly beneath the centre of one of the openings $h$, and enters a recess in each of the pipes D, so that the latter can be turned in any direction, packings, $p$, of leather or other suitable material maintaining tight joint. Each of the pipes D has a three-way cock, $r$, and the neck $s$ of a teat-cup, G, is secured to the turned-up end of each of the pipes by a nut, $t$, as shown in fig. 1. The gutta-percha teat-cups are strengthened and maintained in a comparatively rigid condition by wire rings $v$, $v^1$, and $v^2$, the distance between the rings $v$ and $v^1$ being greater than between the rings $v^1$ and $v^2$, for a purpose described hereafter.

When it is desired to use the machine the cocks $r$ are so adjusted that communication is opened between the teat-cups and the vessel A, the pipes D are then moved until the cups G are in a proper position to receive the teats of the cow to be milked. The instrument is held in one hand by the handle C', and the lever C is operated by the other hand. When the piston B is raised a partial vacuum is formed beneath the same in the vessel A, and the pressure of air from without closes the flap-valve $k$ and opens the valve $i$ at the same time. The portion of each teat-cup between the rings $v$ and $v^1$ collapses and exerts a pressure upon the cow's teat similar to the pressure of the hand in ordinary milking, and the milk which is thus extracted passes through the branch pipes into the vessel A. When the motion of the piston is reversed the pressure within the vessel A closes the valves $i$ and opens the valve $k$, through which the milk is discharged into any suitable receptacle. This operation is continued, the milk being drawn into the vessel as the piston is raised, and discharged from it when lowered, until the cow has been milked, when the machine is applied to another cow and operated with a like result. It is not necessary that all of the teats of the cow should be milked at one time, as the cocks can be operated so as to shut off the communication of any of the teat-cups with the vessel A. After using the instrument, the cocks $r$ may be turned to the position shown in fig. 1, in order to allow the milk remaining in the branch pipes D to run off through the openings $x$. After the instrument has been used for a short time, the leather disk $a$ of the plunger B absorbs a quantity of moisture and consequently expands, thus making a perfectly tight joint between the said plunger and the sides of the vessel A.

Heretofore it has been customary to wind a spiral coil of wire around the teat-cups to prevent them from collapsing, but it has been found that the cups are too rigid when this continuous coil is used. The separate wire rings, above described, answer the purpose, and at the same time do not interfere with the flexibility or proper operation of the teat-cups.

I claim as my invention, and desire to secure by Letters Patent—

1. The combination with the vessel A of a piston, B, its rod, $d$, and the operating lever C, the whole being constructed, arranged, and operating substantially as set forth for the purpose specified.

2. The branch pipes D rendered adjustable on the vessel A, substantially as and for the purpose herein set forth.

3. The adjustable teat-cups G, strengthened by the rings $v\ v^1$ and $v^2$, substantially in the manner described.

4. The manner, substantially as described, of securing the teat-cups G to the branch pipes D.

In testimony whereof I have signed my name to this specification in the presence of two subscribing witnesses.

GEORGE H. GARDNER.

Witnesses:
JOHN WHITE,
W. J. R. DELANY.